United States Patent
Ootsubo et al.

(10) Patent No.: US 12,173,162 B2
(45) Date of Patent: Dec. 24, 2024

(54) PIGMENT AND METHOD FOR PRODUCING THE SAME

(71) Applicants: DIC Corporation, Tokyo (JP); National Institute of Advanced Industrial Science and Technology, Tokyo (JP)

(72) Inventors: Takahiko Ootsubo, Sakura (JP); Hitoshi Sekine, Sakura (JP); Kouji Nemoto, Tsukuba (JP); Atsushi Yamamoto, Tsukuba (JP); Ken-ichi Tominaga, Tsukuba (JP); Masumi Asakawa, Tsukuba (JP); Kazuhiko Sato, Tsukuba (JP)

(73) Assignees: DIC CORPORATION, Tokyo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 926 days.

(21) Appl. No.: 17/276,895

(22) PCT Filed: Sep. 25, 2019

(86) PCT No.: PCT/JP2019/037551
§ 371 (c)(1),
(2) Date: Mar. 17, 2021

(87) PCT Pub. No.: WO2020/067140
PCT Pub. Date: Apr. 2, 2020

(65) Prior Publication Data
US 2021/0380811 A1 Dec. 9, 2021

(30) Foreign Application Priority Data
Sep. 27, 2018 (JP) .................... 2018-182030
Dec. 25, 2018 (JP) .................... 2018-241015

(51) Int. Cl.
*C09B 63/00* (2006.01)
*C08K 5/00* (2006.01)
*C09D 11/037* (2014.01)

(52) U.S. Cl.
CPC ............ *C09B 63/00* (2013.01); *C08K 5/0041* (2013.01); *C09D 11/037* (2013.01)

(58) Field of Classification Search
CPC ... C08K 5/0041; C09B 63/00; C09B 67/0092; C09D 11/037; C09D 11/322
See application file for complete search history.

(56) References Cited

U.S. PATENT DOCUMENTS

2002/0058016 A1 5/2002 Ichi et al.
2015/0247672 A1 9/2015 Schmidt et al.

FOREIGN PATENT DOCUMENTS

| JP | 51-88519 A | 8/1976 |
| JP | 57-59969 A | 4/1982 |
| JP | 61-183362 A | 8/1986 |
| JP | 63-188363 A | 8/1988 |
| JP | 2013-245241 A | 12/2013 |
| WO | 02/22743 A1 | 3/2002 |

OTHER PUBLICATIONS

Machine Translation of Japan Patent Specification No. JP 57-59969 A. (Year: 1982).*
International Search Report dated Nov. 26, 2019, issued in counterpart International Application No. PCT/JP2019/037551 (2 pages).
Notice of Reasons for Refusal dated Nov. 17, 2020, issued in counterpart JP Patent Application No. 2020-527980, w/English translation (8 pages).
Notice of Reasons for Refusal dated Feb. 22, 2021, issued in counterpart JP Patent Application No. 2020-527980, w/English translation (8 pages).

* cited by examiner

*Primary Examiner* — Anthony J Green
(74) *Attorney, Agent, or Firm* — WHDA, LLP

(57) ABSTRACT

A modified pigment having excellent color tone selectivity is provided by laking dye by an environmentally friendly method without using metal. A modified pigment according to the present invention is obtained by laking a dye containing at least one of an acidic group and a basic group with at least one of an amino acid and protein.

12 Claims, No Drawings

PIGMENT AND METHOD FOR PRODUCING THE SAME

TECHNICAL FIELD

The present invention relates to pigment and a method for producing the same.

BACKGROUND ART

Among pigments used as colorants for inks, paints, molded bodies, and the like is a lake pigment obtained by laking dye using metal ions. The lake pigment has excellent color developability and lightfastness and is, therefore, very widely used as a colorant.

A method for laking dye using metal ions requires a separate wastewater treatment step for removing metal ions, particularly divalent or higher valent metal ions, or the like because the metal ions are discharged into wastewater in production or purification. The separate wastewater treatment step or the like can probably reduce influence on the environment.

However, a production method less likely to affect the environment is required in the lake pigment field because of the recent rise in consumer awareness of environmentally friendly products. That is, a method for producing pigment without using metal ions, the method being capable of reliably preventing the discharge of metal ions, particularly divalent or higher valent metal ions, is required.

For a method for producing pigment without using metal ions, for example, bio-pigments such as pigments containing algae used as they are and the like are investigated (refer to Patent Literature 1).

CITATION LIST

Patent Literature

PTL 1: U.S. Patent Application Publication No. 2015/0247672

SUMMARY OF INVENTION

Technical Problem

However, the method disclosed in Patent Literature 1 has a problem that the selectivity of color tone is poor because the algae are used as they are.

The method disclosed in Patent Literature 1 has poorer color developability as compared to conventional lake pigments obtained by taking dyes using metal ions. Furthermore, conventional bio-pigments are produced through, for example, complicated steps such as an enzyme reaction treatment and a genetic manipulation and therefore have not become widespread.

Accordingly, it is an object of the present invention to provide a modified pigment which is obtained by laking dye by an environmentally friendly method without using metal, particularly a divalent or higher valent metal, and which has excellent color tone selectivity.

Solution to Problem

A modified pigment according to the present invention is obtained by laking a dye containing at least one of an acidic group and a basic group with at least one of an amino acid and protein.

A method for producing a modified pigment according to the present invention includes allowing a dye containing at least one of an acidic group and a basic group to react with at least one of an amino acid and protein in the presence of a catalyst.

Advantageous Effects of Invention

According to the present invention, a modified pigment which is obtained by laking dye by an environmentally friendly method and which has excellent color tone selectivity can be provided.

DESCRIPTION OF EMBODIMENTS

The description of components below is based on typical embodiments of the present invention. The present invention is not limited to the embodiments.

A modified pigment according to the present invention is obtained by laking a dye containing at least one of an acidic group and a basic group with at least one of an amino acid and protein. In the present invention, the term "laking" refers to converting a water-soluble dye into a water-insoluble pigment by a specific treatment. Hereinafter, the dye, the amino acid, and the protein, which are raw materials of the modified pigment according to the present invention, are described in detail and a method for producing the modified pigment is described.

(Dye)

The dye, which is used as a raw material in the present invention, is a water-soluble dye. The dye is not particularly limited as long as the dye contains at least one of the acidic group and the basic group. The dye used may be a known dye.

The dye according to the present invention is an acidic group-containing dye or a basic group-containing dye or may be a dye containing both the acidic group and the basic group.

Hereinafter, the acidic group-containing dye and the basic group-containing dye are separately described in detail.

<Acidic Group-Containing Dye>

The acidic group is one defined as a group that releases protons when being dissolved in water. The acidic group is not particularly limited as long as the group meets this definition. The acidic group is, for example, a sulfo group, a carboxy group, a phenolic hydroxy group, a phosphonic group, or a salt thereof. Among these, the acidic group is preferably the sulfo group, the carboxy group, or a salt thereof because an insoluble pigment can be obtained even if the reaction time for laking is short.

Examples of the acidic group-containing dye include, but are not limited to, methine dyes; anthraquinone dyes such as monocyclic anthraquinone dyes and polycyclic anthraquinone dyes; azo dyes such as benzene azo (monoazo, disazo) dyes, heterocyclic azo (thiazole azo, benzothiazole azo, pyridone azo, pyrazolone azo, thiophene azo, and the like) dyes, and naphthalene azo dyes; xanthene dyes; stilbene dyes; triarylmethane dyes; phthalocyanine dyes; diphenylmethane dyes; triphenylmethane dyes; quinophthalone dyes; and the like, these dyes containing the acidic group. Among these, the acidic group-containing dye is preferably an anthraquinone dye, azo dye, or triphenylmethane dye that contains the acidic group.

The number of acidic groups contained in the dye may be one or more. In particular, the number thereof is preferably two or more and more preferably three or more. The number of acidic groups is preferably large because the insolubility of the modified pigment tends to be high. The upper limit of the number of the acidic groups contained in the dye is usually four. Five or more acidic groups are not excluded.

Thus, the acidic group-containing dye, which is used in the present invention, is not particularly limited and is particularly preferably an anthraquinone dye, azo dye, or triphenylmethane dye that contains two or more of at least sulfo groups or carboxy groups.

The color tone of the dye is not particularly limited and may be any color tone such as red, yellow, or blue or may be an appropriate mixture of these. The modified pigment according to the present invention can maintain substantially the same type of color tone as that of the dye even after the laking of the dye and therefore has excellent industrial applicability and is preferable in production. In particular, the modified pigment according to the present invention is such that color adjustment is performed by mixing dyes before laking and the obtained mixed dyes can be laked in one operation. In this case, the modified pigment can be produced so as to have a target color tone. This is very preferable in production.

Examples of a red dye include C.I. Acid Reds 1, 4, 13, 14, 18, 27, 35, 37, 50, 51, 52, 54, 57, 73, 87, 88, 92, 94, 97, 111, 114, 119, 127, 128, 131, 138, 151, 154, 182, 183, 184, 186, 195, 211, 213, 215, 219, 249, 251, 254, 256, 257, 260, 265, 266, 299, 315, 336, 337, 357, 359, 361, 362, 374, 405, 414, 418, 419, 425, 426, 430, 432, 447, and the like. Among these, C.I. Acid Reds 13, 14, 18, 27, 50, and 52 are preferable. In addition to the above, Allura Red AC and Gallion can be successfully used.

Examples of a yellow dye include C.I. Acid Yellows 3, 11, 17, 19, 23, 25, 36, 42, 44, 49, 59, 61, 72, 73, 76, 76, 79, 99, 110, 116, 117, 127, 128, 125, 137, 151, 158:1, 159, 184, 154, 199, 204, 216, 219, 220, 230, 23, 235, 241, 242, 246, 250, 252, and the like. Among these, Acid Yellows 3, 17, and 23 are preferable. In addition to the above, Food Yellow 3 and Direct Yellows 4, 9, and 12 can be successfully used.

Examples of a blue dye include Acid Blues 1, 7, 9, 15, 25, 40, 41, 45, 47, 52, 74, 78, 80, 83, 90, 92, 93, 100, 113, 116, 120, 127, 129, 138, 140, 142, 145, 158, 171, 182, 185, 193, 221, 225, 230, 249, 260, 264, 277, 280, 281, 234, 317, 324, 335, 350, and the like. Among these, Acid Blues 9, 74, 83, 90, 92, and 249 are preferable. In addition to the above, Direct Blues 15, 71, and 86 can be successfully used.

Examples of a green dye include C.I. Acid Greens 1, 9, 12, 16, 20, 25, 27, 28, 41, 43, 50, 62, 68:1, 73, 80, 104, 111, 114, and the like. Among these, C.I. Acid Greens 1, 5, and 25 are preferable. In addition to the above, Food Green 3 and phthalocyaninatoiron tetrasulfonate sodium can be successfully used.

Examples of a reddish yellow (orange) dye include C.I. Acid Oranges 7, 8, 10, 24, 33, 51, 56, 60, 67, 74, 80, 86, 88, 94, 95, 107, 116, 142, 144, 154, 156, and the like. Among these, C.I. Acid Orange 10 is preferable. In addition to the above, Food Yellow 3 and Direct Orange 25 can be successfully used.

Examples of a purple dye include C.I. Acid Violets 1, 7, 12, 17, 43, 48, 49, 54, 58, 68, 90, 97, and the like. Among these, C.I. Acid Violet 49 is preferable.

Examples of a brown dye include C.I. Acid Browns 2, 4, 14, 15, 21, 28, 37, 48, 52, 58, 70, 78, 83, 85, 88, 97, 98, 100, 106, 112, 113, 121, 127, 160, 161, 165, 188, 189, 191, 213, 214, 235, 282, 283, 289, 298, 314, 324, 332, 348, 349, 354, 355, 357, 365, 384, 402, 425, 434, 452, and the like.

Examples of a black dye include C.I. Acid Blacks 1, 2, 24, 26, 52, 60, 63, 71, 84, 107, 132, 164, 168, 170, 172, 194, 207, 210, 234, 235, 243, ATT, and the like. Among these, C.I. Acid Black 1 is preferable. In addition to the above, Direct Blacks 38 and 80 can be successfully used.

<Basic Group-Containing Dye>

The basic group is one defined as a group that donates an electron pair. The basic group is not particularly limited as long as the group meets this definition. Examples of the basic group include amino groups, salts thereof, and the like. The amino groups may be primary amino groups, secondary amino groups, tertiary amino groups, and combinations of these. Furthermore, examples of the basic group include nitrogen-containing functional groups containing a urethane bond or an amido bond and the like. Among these, an amino group or a salt thereof is preferable.

Examples of the basic group-containing dye include, but are not limited to, methine dyes such as polymethine dyes and azomethine dyes; anthraquinone dyes such as monocyclic anthraquinone dyes and polycyclic anthraquinone dyes; azo dyes such as benzene azo (monoazo, disazo) dyes, heterocyclic azo (thiazole azo, benzothiazole azo, pyridone azo, pyrazolone azo, thiophene azo, and the like) dyes, and naphthalene azo dyes; xanthene dyes; stilbene dyes; azine dyes; oxazine dyes; diarylmethane dyes; triarylmethane dyes; phthalocyanine dyes; diphenylmethane dyes; triphenylmethane dyes; quinophthalone dyes; quinoneimine dyes; and the like, these dyes containing the basic group. Among these, the basic group-containing dye is preferably a methine dye, azo dye, xanthene dye, or triphenylmethane dye that contains the basic group.

The number of basic groups contained in the dye may be one or more. In particular, when the number thereof is two or more, the insolubility of the modified pigment tends to be high. This is preferable in practical use. The upper limit of the number of the basic groups contained in the dye is usually nine. Ten or more basic groups are not excluded.

Thus, the basic group-containing dye, which is used in the present invention, is not particularly limited and is particularly preferably a methine dye, azo dye, xanthene dye, or triphenylmethane dye that contains two or more amino groups.

The color tone of the dye is not particularly limited and may be any color tone such as red, yellow, or blue or may be an appropriate mixture of these. The modified pigment according to the present invention can maintain substantially the same type of color tone as that of the dye even after the laking of the dye and therefore has excellent industrial applicability and is preferable in production. In particular, the modified pigment according to the present invention is such that color adjustment is performed by mixing dyes before laking and the obtained dye mixture can be laked in one operation. In this case, the modified pigment can be produced so as to have a target color tone. This is very preferable in production.

Examples of a red dye include C.I. Basic Reds 1, 1:1, 2, 5, 7, 9, 12, 13, 14, 15, 18, 18:1, 22, 29, 46, 49, 51, 54, and the like. Among these, C.I. Basic Reds 2 and 9 are preferable.

Examples of a yellow dye include C.I. Basic Yellows 1, 2, 7, 11, 13, 19, 21, 24, 25, 28, 29, 40, 51, 62, 87, 96, and the like.

Examples of a blue dye include C.I. Basic Blues 1, 3, 7, 9, 11, 12, 17, 20, 22, 24, 26, 41, 41:1, 52, 53, 54, 57, 119, 159, 162, and the like.

Examples of a green dye include C.I. Basic Greens 1, 4, and the like.

Examples of a reddish yellow (orange) dye include C.I. Basic Oranges 1, 2, 14, 21, 22, 30, and the like.

Examples of a purple dye include C.I. Basic Violets 1, 2, 3, 4, 7, 8, 10, 14, 16, 53, and the like.

Examples of a brown dye include C.I. Basic Browns 1, 4, and the like.

Examples of a black dye include C.I. Basic Blacks 1, 2, 3, 7, and the like.

(Amino Acid)

The amino acid, which is used in the present invention, may be an acidic amino acid, a neutral amino acid, or a basic amino acid. Examples of the amino acid, which can be used, include glycine, α-alanine, valine, leucine, isoleucine, serine, threonine, lysine, arginine, aspartic acid, glutamic acid, asparagine, glutamine, cysteine, cystine, methionine, phenylalanine, tyrosine, proline, hydroxyproline, tryptophane, histidine, β-alanine, ε-aminocaproic acid, sarcosine, DL-pyroglutamic acid, and the like.

Among these, when the dye is the acidic group-containing dye, the amino acid is preferably the basic amino acid and is particularly preferably arginine, histidine, or lysine because an insoluble modified pigment can be obtained even if the reaction time for laking is short.

However, when the dye is the basic group-containing dye, the amino acid is preferably the acidic amino acid and is particularly preferably glutamic acid or aspartic acid because an insoluble modified pigment can be obtained even if the reaction time for laking is short.

The amino acid, which is used in the present invention, may be one obtained by breaking down protein or one obtained by synthesis.

As shown in results of an example below, the amino acid can lake a large amount of the dye in a less amount as compared to the protein. The amino acid is more preferable than the protein because the amino acid exhibits high taking efficiency.

(Protein)

The protein, which is used in the present invention, may be a polyamino acid composed of two or more linked amino acids or may be a so-called peptide or a polymeric protein. Amino acids forming the protein may include the above-mentioned amino acid.

That is, when the dye is the acidic group-containing dye, the protein used may be composed of a plurality of types of amino acids or may be composed of a single amino acid as is the case with polylysine, polyarginine, and polyglutamic acid. The protein, which is used in the present invention, preferably contains a basic amino acid from the viewpoint of reactivity with the acidic group-containing dye.

On the other hand, when the dye is the basic group-containing dye, the protein used may be composed of a plurality of types of amino acids or may be composed of a single amino acid as is the case with polyglutamic acid and polyaspartic acid. The protein, which is used in the present invention, preferably contains an acidic amino acid from the viewpoint of reactivity with the basic group-containing dye.

The protein, which is used in the present invention, may have a three-dimensional structure or may be linear. The protein may be a naturally occurring protein or a synthesized protein. The naturally occurring protein, which is not particularly limited, is preferably used because the naturally occurring protein is a regenerative resource and is environmentally friendly and a sustainable modified pigment can be obtained.

Furthermore, the protein, which is used in the present invention, may be a pure substance containing protein only and may be present together with an impurity other than proteins unless an effect of the present invention is impaired. When the protein, which is used in the present invention, is, for example, the naturally occurring protein, another component such as a lipid, sugar, ash, a vitamin, or a nucleic acid may be present in addition to the protein.

Examples of the naturally occurring protein, which is among proteins used in the present invention, include plant-derived proteins, animal-derived proteins, microbe-derived proteins, and the like.

Examples of the plant-derived proteins include soy proteins; pea proteins; wheat glutens; oat proteins; mung proteins; peanut proteins; lentil proteins; corn proteins; sugarcane proteins; proteins derived from algae including spirulina, chlorella, and marine algae such as brown seaweed and kelp; and the like.

Examples of the animal-derived proteins include egg proteins; milk proteins; collagen; gelatin; livestock and fish meat proteins; pilus proteins such as wool, silk, and animal hair; and the like.

Examples of the microbe-derived proteins include proteins derived from yeast, colon bacillus, and malted rice and the like.

The protein, which is used in the present invention, may be okara (soy pulp) by-produced in the production of tofu (soybean curd), defatted soy flour by-produced in the production of soy protein isolate, corncob which is discharged after the industrial use of the above and which is derived from corn, bagasse derived from sugarcane, or the like except the above.

(Method for Producing Modified Pigment)

The modified pigment according to the present invention is obtained in such a manner that the dye is allowed to react with at least one of the amino acid and the protein in the presence of a catalyst such that the dye is laked.

A laking method may be such that the dye is contacted with at least one of the amino acid and the protein in the presence of the catalyst. The catalyst may be one capable of allowing the dye to react with at least one of the amino acid and the protein.

For example, when the dye is the acidic group-containing dye, the catalyst used is preferably an acid catalyst. Examples of the acid catalyst include hydrochloric acid, sulfuric acid, nitric acid, phosphoric acid, and the like. A mixture of these acids can be used. Among these, hydrochloric acid is preferable because an insoluble modified pigment can be obtained even if the reaction time for laking is short.

For example, when the dye is the basic group-containing dye, the catalyst used is preferably a homogeneous catalyst. Examples of the homogeneous catalyst include hydrochloric acid, sulfuric acid, nitric acid, phosphoric acid, fluorosulfuric acid, acetic acid, water, sodium hydroxide, sodium bicarbonate, sodium tetraborate decahydrate, triethylamine, and the like. These can be used in combination. Among these, such a catalyst that an atmosphere exhibits a pH of 5 or more when being homogeneous is preferable because an insoluble modified pigment can be obtained even if the reaction time for laking is short. Particular examples of the homogeneous catalyst include water, sodium bicarbonate, sodium tetraborate decahydrate, and the like. Among these, water is particularly preferable because water is easy to handle and has little impact on the environment.

The mass ratio of at least one of the amino acid and the protein to the dye is usually 1:0.001 to 1:100. In particular, supposing that the mass of at least one of the amino acid and the protein is 1, the mass ratio of the dye is preferably 0.005 or more, more preferably 0.01 or more, further more preferably 0.02 or more, particularly preferably 0.05 or more, and exceptionally preferably 0.1 or more from the viewpoint of the coloring power of the obtained modified pigment. The mass of the dye is preferably 10 or less, more preferably 5 or less, further more preferably 3 or less, particularly preferably 1 or less, and exceptionally preferably 0.5 or less from the viewpoint of obtaining a more environmentally friendly modified pigment. Thus, the mass ratio of at least one of the amino acid and the protein to the dye is preferably 1:0.005 to 1:10, more preferably 1:0.01 to 1:5, further more preferably 1:0.02 to 1:3, particularly preferably 1:0.05 to 1:1, exceptionally preferably 1:0.1 to 1:0.5. Incidentally, the mass of at least one of the amino acid and the protein is mass including the mass of the amino acid alone, the mass of the protein alone, or the sum of the masses of the amino acid and the protein.

In particular, the mass ratio of the amino acid to the dye is more preferably 1:0.05 to 1:3, further more preferably 1:0.05 to 1:2, and particularly preferably 1:0.05 to 1:1.

The mass ratio of the amino acid to the protein is more preferably 1:0.01 to 1:1, further more preferably 1:0.02 to 1:0.5, and particularly preferably 1:0.02 to 1:0.2.

For example, in a case where the acid catalyst is used for the acidic group-containing dye, the amount of the catalyst varies depending on the type of the acid catalyst used in reaction, the normality thereof, production conditions, or the like and therefore cannot be unambiguously determined. The mass ratio of the dye and at least one of the amino acid and the protein to the acid catalyst is usually 1:0.001 to 1:1,000. In particular, supposing that the mass of the dye and at least one of the amino acid and the protein is 1, the mass ratio of the acid catalyst is preferably 0.01 or more, more preferably 0.5 or more, and further more preferably 0.1 or more from the viewpoint of stably obtaining an insoluble modified pigment. The mass of the acid catalyst is preferably 100 or less, more preferably 50 or less, and further more preferably 10 or less from the viewpoint of suppressing the amount of the catalyst used. Thus, the mass ratio of the dye and at least one of the amino acid and the protein to the acid catalyst is preferably 1:0.01 to 1:100, more preferably 1:0.5 to 1:50, and further more preferably 1:0.1 to 1:10.

For example, in a case where the homogeneous catalyst is used for the basic group-containing dye, the amount of the catalyst varies depending on the type of the homogeneous catalyst used in reaction, production conditions, or the like and therefore cannot be unambiguously determined. The mass ratio of the dye and at least one of the amino acid and the protein to the homogeneous catalyst is usually 1:0.01 to 1:1,000. In particular, supposing that the mass of the dye and at least one of the amino acid and the protein is 1, the mass ratio of the homogeneous catalyst is preferably 0.1 or more, more preferably 0.2 or more, and further more preferably 0.5 or more from the viewpoint of stably obtaining an insoluble modified pigment. The mass of the homogeneous catalyst is preferably 500 or less, more preferably 100 or less, further more preferably 50 or less, and particularly preferably 30 or less from the viewpoint of suppressing the amount of the catalyst used. Thus, the mass ratio of the dye and at least one of the amino acid and the protein to the homogeneous catalyst is preferably 1:0.1 to 1:500, more preferably 1:0.1 to 1:10, further more preferably 1:0.2 to 1:50, and particularly preferably 1:0.5 to 1:30.

The normality of the acid catalyst used is not particularly limited as long as the modified pigment according to the present invention is obtained. The normality thereof is preferably 0.001 to 50, more preferably 0.01 to 12, further more preferably, 0.1 to 6, particularly preferably 0.1 to 3, and exceptionally preferably 0.1 to 1.

When reaction is carried out in the presence of the catalyst, a dispersion medium may be used. The dispersion medium used may be various types of solvent.

In particular, in the case where the acid catalyst is used for the acidic group-containing dye, the dispersion medium used is preferably an aqueous solvent. Examples of the aqueous solvent include water; alcohols such as methanol, ethanol, isopropanol, butanol, and glycerin; acetic acid; and the like.

In the case where the homogeneous catalyst is used for the basic group-containing dye, the dispersion medium used is preferably an aqueous organic solvent. Examples of the aqueous organic solvent include alcohols such as methanol, ethanol, isopropanol, butanol, glycerin, and propylene glycol monomethyl ether; ketones such as acetone; cyclic ethers such as tetrahydrofuran (THF) and dioxolane; amides such as dimethylformamide; sulfoxides such as dimethyl sulfoxide; and the like. These may be used in combination.

For example, in a case where the acid catalyst is used for the acidic group-containing dye and the dispersion medium used is the aqueous solvent, the amount of the dispersion medium is such that the mass ratio of the dye and at least one of the amino acid and the protein to the dispersion medium is usually 1:0.5 to 1:1,000.

In particular, supposing that the mass of at least one of the amino acid and the protein is 1, the mass ratio of the dispersion medium, which is the aqueous solvent, is preferably 1 or more, more preferably 10 or more, and further more preferably 50 or more from the viewpoint that mixing with the dye and at least one of the amino acid and the protein is likely to be more uniform. The mass of the dispersion medium is preferably 500 or less, more preferably 300 or less, and further more preferably 200 or less from the viewpoint of suppressing the amount of the dispersion medium used. Thus, the mass ratio of at least one of the amino acid and the protein to the dispersion medium, which is the aqueous solvent, is preferably 1:1 to 1:500, more preferably 1:10 to 1:300, and further more preferably 1:50 to 1:200.

For example, in a case where the homogeneous catalyst is used for the basic group-containing dye and the dispersion medium used is the aqueous organic solvent, the amount of the dispersion medium is such that the mass ratio of the dye and at least one of the amino acid and the protein to the dispersion medium is usually 1:0.5 to 1:1,000.

In particular, supposing that the mass of at least one of the amino acid and the protein is 1, the mass ratio of the dispersion medium, which is the aqueous organic solvent, is preferably 1 or more, more preferably 2 or more, and further more preferably 5 or more from the viewpoint that mixing with the dye and at least one of the amino acid and the protein is likely to be more uniform. The mass of the dispersion medium is preferably 500 or less, more preferably 100 or less, and further more preferably 50 or less from the viewpoint of suppressing the amount of the dispersion medium used. Thus, the mass ratio of at least one of the amino acid and the protein to the dispersion medium, which is the aqueous organic solvent, is preferably 1:1 to 1:500, more preferably 1:2 to 1:100, and further more preferably 1:5 to 1:50.

The reaction temperature for laking is not particularly limited. When the protein is not intended to be denatured, reaction is preferably carried out at 80° C. or lower.

When the reaction time for laking is short, a laking reaction is insufficient, so that the dye separates from the amino acid and/or the protein in post-treatment in some cases. Therefore, the reaction time is preferably sufficient.

The reaction time for laking is not particularly limited, is usually one minute to 30 hours, and is preferably five minutes to ten hours from the viewpoint of production efficiency.

As described above, the laking method in the present invention may be such that the dye is contacted with at least one of the amino acid and the protein in the presence of the catalyst. For example, the dye and at least one of the amino acid and the protein may be put into a solvent one by one in random order so as to be contacted with each other or a solution of the dye and a solution containing at least one of the amino acid and the protein may be mixed together such that the dye and at least one of the amino acid and the protein are contacted with each other. From the viewpoint of controlling the laking reaction, a method for adding the catalyst in the laking reaction is preferably one in which, after the catalyst is added to a solution containing at least one of the amino acid and the protein, a solution of the dye is added thereto.

Since an insoluble lake compound is precipitated by laking as described above, this is subjected to solid-liquid separation by a known method and is washed as required. Examples of a method for solid-liquid separation include suction filtration, pressure filtration, filter pressing, spray drying, decantation, centrifugal separation, and the like. Examples of a washing solution include hydrophilic solvents such as water and alcohol.

When the dye is the acidic group-containing dye, the washing solution is water, methanol, or the like and is particularly preferably methanol. When the dye is the basic group-containing dye, the washing solution is preferably water.

When an unreacted raw material remains, the unreacted raw material is removed by the washing treatment. Powder is dried by a known method after solid-liquid separation or washing, whereby the modified pigment is obtained.

The average primary particle size of the obtained modified pigment is not particularly limited and is usually 0.5 nm to 1,000 μm. In particular, the average primary particle size thereof is preferably 1 nm or more, more preferably 10 nm or more, further more preferably 20 nm or more, and particularly preferably 50 nm or more. The average primary particle size thereof is preferably 100 μm or less, more preferably 50 μm or less, further more preferably 10 μm or less, and particularly preferably 1 μm or less. Thus, the average primary particle size of the obtained modified pigment is preferably 1 nm to 100 μm, more preferably 10 nm to 50 μm, further more preferably 20 nm to 10 μm, and particularly preferably 50 nm to 1 μm. Incidentally, the value of the average primary particle size of the modified pigment is an arithmetic average which is obtained in such a manner that particles are photographed with a transmission or scanning electron microscope and 20 of the particles are measured for maximum size.

It is difficult to estimate the structure of the modified pigment according to the present invention by a current analysis technique. The modified pigment, which is obtained by a production method according to the present invention, is probably such that an acidic group in the dye and a basic group in the amino acid or the protein act with each other to insolubilize and pigment the dye or a basic group in the dye and an acidic group in the amino acid or the protein act with each other to insolubilize and pigment the dye.

Since the above-mentioned production method according to the present invention does not use metal ions, particularly divalent or higher valent metal ions, the metal ions, particularly the divalent or higher valent metal ions, are not discharged into wastewater in production or purification. Therefore, in accordance with the production method according to the present invention, the dye can be laked by an environmentally friendly method. Furthermore, a step such as an enzyme reaction step or a genetic manipulation step is unnecessary. Therefore, the modified pigment can be readily produced at low cost in such a manner that the dye is laked by such an environmentally friendly method.

The modified pigment, which is obtained by the production method according to the present invention, has substantially the same type of color as that of the dye, which is a raw material, and has excellent color developability. Varying the dye, which is a raw material, enables modified pigments with any color tone to be produced, leading to excellent color selectivity. Therefore, the modified pigment according to the present invention can be successfully used in applications such as pigment compositions, molded bodies, inks, and prints taken using ink.

(Pigment Composition)

The modified pigment according to the present invention can be converted into a pigment composition by blending the modified pigment according to the present invention with another material.

(Resin)

The pigment composition according to the present invention can be obtained by blending the modified pigment according to the present invention with resin. Examples of the resin that can be used in the present invention include thermosetting resins, thermoplastic resins, and the like.

A thermosetting resin is resin that has a characteristic of capable of becoming substantially infusible and insoluble when the resin is cured by a means such as heating, radiation, or a catalyst. Examples of the thermosetting resin include phenolic resins, urea resins, melamine resins, benzoguanamine resins, alkyd resins, unsaturated polyester resins, vinyl ester resins, diallyl terephthalate resins, epoxy resins, silicone resins, urethane resins, furan resins, ketone resins, xylene resins thermosetting polyimide resins, benzoxazine resins, active ester resins, aniline resins, cyanate ester resins, styrene maleic anhydride (SMA) resins, and the like. These thermosetting resins may be used alone or in combination.

A thermoplastic resin is resin that can be melt-molded by heating. Examples of the thermoplastic resin include polyethylene resins, polypropylene resins, polystyrene resins, rubber-modified polystyrene resins, acrylonitrile-butadiene-styrene (ABS) resins, acrylonitrile-styrene (AS) resins, polymethyl methacrylate resins, acrylic resins, polyvinyl chloride resins, polyvinylidene chloride resins, polyethylene terephthalate resins, ethylene-vinyl alcohol resins, cellulose acetate resins, ionomer resins, polyacrylonitrile resins, polyamide resins, polyacetal resins, polybutylene terephthalate resins, polylactic resins, polyphenylene ether resins, modified polyphenylene ether resins, polycarbonate resins, polylsulfone resins, polyphenylene sulfide resins, polyether imide resins, polyether sulfone resins, polyarylate resins, thermoplastic polyimide resins, polyamideinmide resins, polyether ether ketone resins, polyketone resins, liquid-crystal polyester resins, fluorocarbon resins, syndiotactic polystyrene resins, cyclic polyolefin resins, and the like. These thermoplastic resins may be used alone or in combination.

The resin according to the present invention may be blended as a molding resin or varnish. The resin may be blended in the hope of obtaining an effect as an additive such as a dispersant, a surface modifier, a surfactant, or a film strengthening agent.

In a case where the resin is blended as varnish, a known resin can be used. Examples of the resin blended as varnish include phenol resins, petroleum resins, rosin-modified phenol resins, petroleum resin-modified phenol resins, rosin esters, alkyd resins, modified alkyd resins, rosin-modified maleic resins, gilsonite resins, urethane resins, epoxy resins, and the like.

In a case where the resin is blended as a dispersant or a surface modifier, a known resin can be used. Examples of the resin blended as such a dispersant or surface modifier include cellulose; cellulose derivatives such as alkylcelluloses (ethylcellulose, methylcellulose, and the like), hydroxyalkylcelluloses (hydroxymethylcellulose, hydroxyethylcellulose, hydroxypropylcellulose, hydroxypropylmethylcellulose, hydroxyethylmethylcellulose, and the like), carboxyalkylcelluloses (carboxymethylcellulose, carboxyethylcellulose, and the like), and cellulose acetate; alkylallyl polyether alcohols; sucrose esters of fatty acids; polyoxyethylene alkyl ethers; polyoxyethylene hydrogenated castor oil; propylene glycol esters of fatty acids; laurylsulfates; stearates; sorbitan esters of fatty acids; polyethylene glycol esters of fatty acids; polyoxyethylene glycerol esters of fatty acids; glycerol esters of fatty acids; polyoxyethylene polyoxypropylene glycols; polyoxyethylene sorbitol esters of fatty acids; polyoxyethylene alkylallyl ethers; alkylallylsulfonates; polyoxyethylene sorbitan esters of fatty acids; or mixtures thereof.

(Solvent)

The pigment composition according to the present invention can be further blended with a solvent. The solvent may be used as a diluent solvent and may be blended in the hope of obtaining an effect as an additive such as varnish or dampening water.

The solvent is not particularly limited and may be used depending on applications. Examples of the solvent include water, aqueous solvents, organic solvents, liquid organic polymers, and the like. These solvents can be used alone or in combination.

Examples of the organic solvents include ketones such as acetone, methyl ethyl ketone (MEK), and methyl isobutyl ketone (MIBK); cyclic ethers such as tetrahydrofuran (THF) and dioxolane; esters such as methyl acetate, ethyl acetate, and butyl acetate; aromatics such as toluene and xylene; paraffinic solvents such as n-pentane, isopentane, n-hexane, 2-methylpentane, n-heptane, n-octane, and trimethylpentane; naphthenic solvents such as cyclohexane, cyclohexylmethane, octadecylcyclohexane, and methylisopropylcyclohexane; alcohols such as carbitol, cellosolve, methanol, isopropanol, butanol, and propylene glycol monomethyl ether; mineral spirits; petroleum naphtha; and the like.

For example, the following oils can be used as a solvent: non-drying oils such as castor oil, peanut oil, and olive oil; semi-drying oils such as soybean oil, cottonseed oil, canola oil, sesame oil, and corn oil; drying oils such as linseed oil, perilla oil, and tang oil; plant-derived oils such as regenerated vegetable oils and vegetable esters; and the like.

(Other Ingredients)

The pigment composition according to the present invention may contain ingredients such as an anti-skinning agent, a viscosity modifier, a film strengthening agent, a dispersant, an antifoulant, an emulsion regulator, and an oxidation inhibitor as required. Those conventionally known can be successfully used as these ingredients.

(Molded Body)

When the pigment composition according to the present invention contains a molding resin, the pigment composition can be formed into a molded body. A forming method used may be a conventionally known method and may be appropriately selected depending on applications. The shape of the molded body is not particularly limited and may be a flat, sheet, or three-dimensional shape entirely or partly having a curvature or may be any shape depending on purposes.

A method for forming the molded body according to the present invention is generally an extrusion forming method in order to manufacture, for example, a flat or sheet-shaped product and may be flat pressing. In addition, a profile extrusion method, a blow molding method, a compression molding method, a vacuum forming method, an injection molding method, and the like can be used. A melt extrusion method and a solution-casting method can be used to manufacture a film-shaped product. In the case of using a melt molding method, for example, blown film extrusion, cast molding, extrusion lamination molding, calendar molding, sheet forming, fiber forming, blow molding, injection molding, rotational molding, coating molding, and the like can be used. For resins cured with heat or an active energy ray, the molded body can be manufactured by various curing methods using heat or active energy rays.

When the resin composition is liquid, the resin composition can be formed by coating. Examples of a coating method include a spraying method, a spin coating method, a dipping method, a roll coating method, a blade coating method, a doctor roll method, a doctor blade method, a curtain coating method, a slit coating method, a screen printing method, an ink jet method, and the like.

(Ink and Print)

The pigment composition according to the present invention can be used in inks. An ink containing the pigment composition according to the present invention contains resin and/or an organic solvent in addition to the modified pigment according to the present invention. The modified pigment according to the present invention has the same kind or color as that of dye, which is a raw material, and has excellent color developability. Therefore, using the modified pigment in ink serving as a colorant enables vivid printing.

Using an ink according to the present invention enables a print printed with the ink according to the present invention to be obtained. A base material for print objects is not particularly limited and paper, wood, plastic, inorganic materials such as metals and minerals, composites thereof, and the like can be exemplified. The shape of the base material is not particularly limited and may be a flat, sheet, or three-dimensional shape entirely or partly having a curvature or may be any shape depending on purposes. The hardness, thickness, and the like of the base material are not particularly limited.

A printing method using the ink according to the present invention is not particularly limited. Letterpress, flexographic printing, and dry offset printing can be exemplified as relief printing; gravure printing, gravure offset printing, and pad printing can be exemplified as intaglio printing; offset printing can be exemplified as planographic printing; and screen printing can be exemplified as permeographic printing. In addition to these, ink jet printing can be exemplified. The printing method is not limited to these.

As an ink-fixing method, an evaporative drying type, an oxidative polymerization type, a two-part reaction type, an ultraviolet curable type, an electron beam-curable type, a penetration drying type, and the like can be exemplified. The ink-fixing method is not limited to these.

As described above, the modified pigment according to the present invention can be successfully used in applications such as pigment compositions, molded bodies, inks, and prints taken using ink.

EXAMPLES

The present invention is further described below in detail with reference to examples. The present invention is not limited to the examples below without departing from the spirit thereof. Incidentally, "parts" and "%" in the examples are on a mass basis unless otherwise specified.

Production Method 1-1

Ten parts by mass of protein and 100 parts by mass of 1 N hydrochloric acid were weighed into a 100 mL beaker, followed by dispersing using a magnetic stirrer. Twenty parts by mass of a 0.5 mass percent aqueous solution of an acidic group-containing dye was added thereto, followed by continuous stirring at room temperature (25° C.) for five minutes. Thereafter, a dispersion was taken into a centrifuge tube (manufactured by As One Corporation, a diameter of 29 mm, a length of 15 mm) and was centrifuged at 5,000 G for five minutes. To a precipitate obtained by removing a supernatant liquid, 48 parts by mass of methanol (produced by Kishida Chemical Co., Ltd., first grade) was added, followed by stirring using a spatula and then centrifugation at 5,000 G for five minutes again. This washing operation was repeated three times, followed by suction filtration using filter paper (manufactured by Advantec Co., Ltd., Qualitative Filter Paper No. 1, 70 mm). After filtered-out solid matter was transferred to a 50 mL beaker and was naturally dried at room temperature for 24 hours, obtained dry powder was passed through a sieve with 100 μm openings, whereby a pigment powder was obtained.

Production Method 1-2

Sixty seven parts by mass of protein and 100 parts by mass of 1 N hydrochloric acid were weighed into a 1 L beaker and were uniformly kneaded at room temperature for five minutes using a spatula. Sixty seven parts by mass of a two mass percent solution of an acidic group-containing dye (1 N hydrochloric acid solution) was added thereto, followed by uniform kneading at room temperature for five minutes using the spatula. Subsequently, 425 parts by mass of methanol (produced by Kishida Chemical Co., Ltd., first grade) was added, followed by uniform stirring for five minutes using the spatula and then standing for 30 minutes. Thereafter, solid-liquid separation by suction filtration using filter paper (manufactured by Advantec Co., Ltd., Qualitative Filter Paper No. 1, 70 mm) and washing with 265 parts by mass of methanol were performed twice. After filtered-out solid matter was transferred to a 1 L beaker and was vacuum-dried by heating at 40° C., dried powder was pulverized in a ball mill (manufactured by Fritsch Japan Co., Ltd., Pulverisette 6; zirconia balls with a diameter of 10 mm, a filling factor of 70%, 400 rpm for ten minutes twice). Subsequently, the pulverized powder was passed through a sieve with 100 openings, whereby a pigment powder was obtained.

Production Method 1-3

Forty nine parts by mass of protein and 100 parts by mass of 1 N hydrochloric acid were weighed into a 1 L beaker and were uniformly kneaded at room temperature for five minutes using a spatula. One hundred parts by mass of a five mass percent solution of an acidic group-containing dye (1 N hydrochloric acid solution) was added thereto, followed by uniform kneading at room temperature for 30 minutes using the spatula. Subsequently, 344 parts by mass of methanol (produced by Kishida Chemical Co., Ltd., first grade) was added, followed by uniform stirring for five minutes using the spatula and then standing for 30 minutes. Thereafter, solid-liquid separation by suction filtration using filter paper (manufactured by Advantec Co., Ltd., Qualitative Filter Paper No. 1, 70 mm) and washing with 215 parts by mass of methanol were performed twice. After filtered-out solid matter was transferred to a 1 L beaker and was vacuum-dried by heating at 50° C., dried powder was pulverized in a ball mill (manufactured by Fritsch Japan Co., Ltd., Pulverisette 6; zirconia balls with a diameter of 10 mm, a filling factor of 70%, 400 rpm for ten minutes once). Subsequently, the pulverized powder was passed through a sieve with 100 μm openings, whereby a pigment powder was obtained.

Example 1-1

A red water-insoluble powder was obtained by a method described in Production Method 1-1 using a soy protein (produced by Nippon Garlic Corporation, Soy Protein (trade name)) and C.I. Acid Red 13 (produced by Tokyo Chemical Industry Co., Ltd.) as protein and dye, respectively. In this operation, filtrate obtained after suction filtration was colorless and transparent. Furthermore, the obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis.

Examples 1-2 to 1-4

Water-insoluble powders were obtained by substantially the same method as that described in Example 1-1 except that an acidic group-containing dye was changed to those described in Table 1. In this operation, filtrate obtained after suction filtration was colorless and transparent. Furthermore, each obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis.

Example 1-5

A red water-insoluble powder was obtained by a method described in Production Method 1-2 using defatted soy flour (produced by Nisshin Shokai Co., Ltd., ZFS SOYA) and C.I. Acid Red 18 (produced by Tokyo Chemical Industry Co., Ltd.) as protein and an acidic group-containing dye, respectively. In this operation, filtrate obtained after suction filtration was colorless and transparent. Furthermore, the obtained powder was re-dispersed in room-temperature water for confirmation, whereby water was found to be not colored Thus, the obtained powder was found to be an entirely laked modified pigment. The recovery rate of powder before and after sieving was more than 99% on a mass basis.

Examples 1-6 to 1-29

Water-insoluble powders were obtained by substantially the same method as that described in Example 1-1 except that an acidic group-containing dye and protein were changed to those described in Table 1. In this operation, filtrate obtained after suction filtration was colorless and transparent. Furthermore, each obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis.

Example 1-30

A water-insoluble powder was obtained by substantially the same method as that described in Example 1-1 except that, in Example 1-1, a 0.5 mass percent aqueous solution of an acidic group-containing dye was prepared using a black dye obtained by mixing 9% by mass of C.I. Acid Yellow 17, 17% by mass of C.I. Acid Yellow 23, 23% by mass of C.I. Acid Red 27, and 51% by mass of C.I. Acid Blue 74 together and protein was changed to that described in Table 1. In this operation, filtrate obtained after suction filtration was colorless and transparent. Furthermore, the obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis. The color tone of the modified pigment was black.

Example 1-31

A water-insoluble powder was obtained by substantially the same method as that described in Example 1-1 except that, in Example 1-1, a 0.5 mass percent aqueous solution of an acidic group-containing dye was prepared using a black dye obtained by mixing 9% by mass of C.I. Acid Yellow 17, 17% by mass of C.I. Acid Yellow 23, 23% by mass of C.I. Acid Red 27, and 51% by mass of C.I. Acid Black 1 and protein was changed to that described in Table 1. In this operation, filtrate obtained after suction filtration was colorless and transparent. Furthermore, the obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis. The color tone of the modified pigment was black.

Example 1-32

A water-insoluble powder was obtained by substantially the same method as that described in Example 1-1 except that, in Example 1-1, a 0.5 mass percent aqueous solution of an acidic group-containing dye was prepared using a black dye obtained by mixing 15% by mass of C.I. Acid Orange 10, 30% by mass of C.I. Acid Red 27, 5% by mass of C.I. Acid Violet 49, and 50% by mass of C.I. Acid Blue 92 together and protein was changed to that described in Table 1. In this operation, filtrate obtained after suction filtration was colorless and transparent. Furthermore, the obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis. The color tone of the modified pigment was black.

Example 1-33

A red water-insoluble powder was obtained by a method described in Production Method 1-3 using defatted soy flour (produced by Nisshin Shokai Co., Ltd., ZFS SOYA) and C.I. Acid Red 18 (produced by Tokyo Chemical Industry Co., Ltd.) as protein and an acidic group-containing dye, respectively. In this operation, filtrate obtained after suction filtration was colorless and transparent. Furthermore, the obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis.

TABLE 1

| | Protein | Acidic group-containing dye | Production method | External color tone of modified pigment | Recovery rate of 100 μm undersize |
|---|---|---|---|---|---|
| Example 1-1 | Soy protein | C.I. Acid Red 13 | Production method 1-1 | Red | More than 99% |
| Example 1-2 | Soy protein | C.I. Acid Green 5 | Production method 1-1 | Green | More than 99% |
| Example 1-3 | Soy protein | C.I. Acid Blue 9 | Production Method 1-1 | Blue | More than 99% |
| Example 1-4 | Soy protein | C.I. Acid Yellow 23 | Production method 1-1 | Yellow | More than 99% |
| Example 1-5 | ZFS SOYA | C.I. Acid Red 18 | Production method 1-2 | Red | More than 99% |
| Example 1-6 | ZFS SOYA | Food Green 3 | Production method 1-2 | Green | More than 99% |
| Example 1-7 | ZFS SOYA | C.I. Acid Blue 92 | Production method 1-2 | Blue | More than 99% |
| Example 1-8 | ZFS SOYA | C.I. Acid Yellow 23 | Production method 1-2 | Yellow | More than 99% |
| Example 1-9 | ZFS SOYA | C.I. Acid Red 14 | Production method 1-1 | Red | More than 99% |
| Example 1-10 | ZFS SOYA | C.I. Acid Red 27 | Production method 1-1 | Red | More than 99% |
| Example 1-11 | ZFS SOYA | C.I. Acid Red 50 | Production method 1-1 | Red | More than 99% |
| Example 1-12 | ZFS SOYA | C.I. Acid Red 52 | Production method 1-1 | Red | More than 99% |
| Example 1-13 | ZFS SOYA | Altura Red AC | Production method 1-1 | Red | More than 99% |
| Example 1-14 | ZFS SOYA | Gallon | Production method 1-1 | Red | More than 99% |
| Example 1-15 | ZFS SOYA | C.I. Acid Green 25 | Production method 1-1 | Green | More than 99% |
| Example 1-16 | ZFS SOYA | C.I. Acid Green 1 | Production method 1-1 | Green | More than 99% |
| Example 1-17 | ZFS SOYA | Phthalocyaninatotron tetrasulfonate sodium | Production method 1-1 | Green | More than 99% |
| Example 1-18 | ZFS SOYA | C.I. Acid Blue 74 | Production method 1-1 | Blue | More than 99% |
| Example 1-19 | ZFS SOYA | C.I. Acid Blue 83 | Production method 1-1 | Blue | More than 99% |
| Example 1-20 | ZFS SOYA | C.I. Acid Blue 90 | Production method 1-1 | Blue | More than 99% |
| Example 1-21 | ZFS SOYA | C.I. Acid Blue 249 | Production method 1-1 | Blue | More than 99% |
| Example 1-22 | ZFS SOYA | C.I. Acid Yellow 3 | Production method 1-1 | Yellow | More than 99% |
| Example 1-23 | ZFS SOYA | C.I. Acid Yellow 17 | Production method 1-1 | Yellow | More than 99% |
| Example 1-24 | ZFS SOYA | Direct Yellow 9 | Production method 1-1 | Yellow | More than 99% |
| Example 1-25 | ZFS SOYA | Direct Yellow 4 | Production method 1-1 | Yellow | More than 99% |
| Example 1-26 | ZFS SOYA | C.I. Acid Violet 49 | Production method 1-1 | Purple | More than 99% |
| Example 1-27 | ZFS SOYA | C.I. Acid Orange 10 | Production method 1-1 | Orange | More than 99% |

TABLE 1-continued

| | Protein | Acidic group-containing dye | Production method | External color tone of modified pigment | Recovery rate of 100 μm undersize |
|---|---|---|---|---|---|
| Example 1-28 | ZFS SOYA | Food Yellow 3 | Production method 1-1 | Yellow | More than 99% |
| Example 1-29 | ZFS SOYA | C.I. Acid Black 1 | Production method 1-1 | Black | More than 99% |
| Example 1-30 | ZFS SOYA | 9% by mass C.I. Acid Yellow 17 17% by mass C.I. Acid Yellow 23 23% by mass C.I. Acid Red 27 51% by mass C.I. Acid Blue 74 | Production method 1-1 | Black | More than 99% |
| Example 1-31 | ZFS SOYA | 9% by mass C.I. Acid Yellow 17 17% by mass C.I. Acid Yellow 23 23% by mass C.I. Acid Red 27 51% by mass C.I. Acid Black 1 | Production method 1-1 | Black | More than 99% |
| Example 1-32 | ZFS SOYA | 1514 by mass C.I. Acid Orange 10 30% by mass C.I. Acid Red 27 5% by mass C.I. Acid Violet: 49 50% by mass C.I. Acid Blue 92 | Production method 1-1 | Black | More than 99% |
| Example 1-33 | ZFS SOYA | C.I. Acid Red 18 | Production method 1-1 | Red | More than 99% |

Example 1-34

Fifty parts by mass of a milk-derived casein micro-powder (produced by FUJIFILM Wako Pure Chemical Corporation) pulverized in a ball mill (manufactured by Fritsch Japan Co., Ltd., Pulverisette 6; zirconia balls with a diameter of 10 mm, a filling factor of 70%, 400 rpm for ten minutes once) in advance as protein and 100 parts by mass of 1 N hydrochloric acid were weighed into a 50 mL beaker and were uniformly kneaded at room temperature for five minutes using a spatula. One hundred and five parts by mass of a five mass percent solution of C.I. Acid Red 13 (produced by Tokyo Chemical Industry Co., Ltd.) (1 N hydrochloric acid solution) as an acidic group-containing dye was added thereto, followed by uniform kneading at room temperature for five minutes using the spatula and then standing for 30 minutes, thereby causing reaction. Subsequently, 600 parts by mass of methanol (produced by Kishida Chemical Co., Ltd., first, grade) was added, followed by uniform stirring for five minutes using the spatula. Solid-liquid separation by suction filtration using filter paper (manufactured by Advantec Co., Ltd., Qualitative Filter Paper No. 1, 70 mm) and washing with 435 parts by mass of methanol were performed twice. Filtered-out solid matter was transferred to a 50 mL beaker and was vacuum-dried by heating at 50° C. Dried powder was passed through a sieve with 100 μm openings, whereby a water-insoluble pigment powder was obtained.

The powder was red and filtrate obtained after suction filtration was colorless and transparent. Furthermore, the obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis.

Example 1-35

Fifty parts by mass of a wheat-derived gluten powder (produced by FUJIFILM Wako Pure Chemical Corporation) as protein was put into a 50 mL beaker, 105 parts by mass of a five mass percent solution of C.I. Acid Red 13 (produced by Tokyo Chemical Industry Co., Ltd.) (1 N hydrochloric acid solution) as an acidic group-containing dye was added thereto, and the wheat-derived gluten powder and the solution were uniformly kneaded at room temperature for five minutes, followed by standing for 30 minutes, thereby causing reaction. Thereafter, 600 parts by mass of methanol (produced by Kishida Chemical Co., Ltd., first grade) was added, followed by uniform stirring for five minutes using a spatula. Solid-liquid separation by suction filtration using filter paper (manufactured by Advantec Co., Ltd., Qualitative Filter Paper No. 1, 70 mm) and washing with 435 parts by mass of methanol were performed twice. Filtered-out solid matter was transferred to a 50 mL beaker and was vacuum-dried by heating at 50° C. After dried powder was ground in an agate mortar, the powder was passed through a sieve with 100 μm openings, whereby a water-insoluble pigment powder was obtained.

The powder was red and filtrate obtained after suction filtration was colorless and transparent. Furthermore, the obtained powder was re-dispersed in room-temperature water for confirmation, whereby water was found to be not colored. Thus, the obtained powder was found to be an entirely laked modified pigment. The recovery rate of powder before and after sieving was more than 99% on a mass basis.

Example 1-36

Fifty parts by mass of a bagasse micro-powder (produced by Maeda Super Techno Co., Ltd.) as protein and 100 parts by mass of 1 N hydrochloric acid were weighed into a 50 mL beaker and were uniformly kneaded at room temperature for five minutes using a spatula. One hundred and five parts by mass of a five mass percent solution of C.I. Acid Red 18 (produced by Tokyo Chemical Industry Co., Ltd.) (1 N hydrochloric acid solution) as an acidic group-containing dye was added thereto, followed by uniform kneading at room temperature for five minutes using the spatula and then standing for 30 minutes, thereby causing reaction. Subsequently, 600 parts by mass of methanol (produced by Kishida Chemical Co., Ltd., first grade) was added and solid-liquid separation by suction filtration using filter paper (manufactured by Advantec Co., Ltd., Qualitative Filter Paper No. 1, 70 mm) and washing with 435 parts by mass of methanol were performed twice. Filtered-out solid matter was transferred to a 50 mL beaker and was vacuum-dried by heating at 50° C. Dried powder was passed through a sieve with 100 μm openings, whereby a water-insoluble pale-red pigment powder was obtained. The recovery rate of powder before and after sieving was more than 99% on a mass basis.

Example 1-37

To a 100 mL beaker, 9.3 parts by mass of C.I. Acid Red 18 (produced by Tokyo Chemical Industry Co., Ltd.) as an acidic group-containing dye and 100 parts by mass of 1 N hydrochloric acid were added, followed by dispersing using a magnetic stirrer. As an amino acid, one obtained by dissolving 1.1 parts by mass of L-Lysine (produced by FUJIFILM Wake Pure Chemical Corporation, L(+)-Lysine, first grade) in 15 parts by mass of 1 N hydrochloric acid was added dropwise thereto. After 30 minutes, the one obtained by dissolving 1.1 parts by mass of L-Lysine in 15 parts by mass of 1 N hydrochloric acid was added dropwise thereto afresh. The dropwise addition was performed four times in total at intervals of 30 minutes. After performing the dropwise addition four times in total, solid-liquid separation by suction filtration using filter paper (manufactured by Advantec Co., Ltd., Qualitative Filter Paper No. 1, 70 mm) was performed, followed by washing with 19 parts by mass of water. Filtered-out solid matter was transferred to a 50 mL beaker and was vacuum-dried by heating at 50° C. After dried powder was ground in an agate mortar, the powder was passed through a sieve with 100 μm openings, whereby a water-insoluble red pigment powder was obtained. The recovery rate of powder before and after sieving was more than 99% on a mass basis.

Example 1-38

A water-insoluble yellow pigment powder was obtained in substantially the same manner as that used in Example 1-37 except that, in Example 1-37, 8.2 parts by mass of C.I. Acid Yellow 23 (produced by Tokyo Chemical Industry Co., Ltd.) was used as an acidic group-containing dye instead of C.I. Acid Red 18. The recovery rate of powder before and after sieving was more than 99% on a mass basis.

Comparative Example 1-1

Powder was obtained in substantially the same manner as that used in Example 1-1 except that 100 parts by mass of water was used instead of 1 N hydrochloric acid. The obtained powder had lower color developability as compared to that obtained Example 1-1. The obtained powder was re-dispersed in room-temperature water for confirmation, whereby water was found to be colored. Furthermore, a white powder was precipitated and a portion of the white powder was dissolved in water.

Example 2-1

For whether either an amino acid or protein can lake a larger amount of dye, the amino acid and the protein were evaluated for laking efficiency by experiments below.

A laking reaction was carried out in substantially the same manner as that used in Example 1-5 or 1-37 except that C.I. Acid Red 18 and the protein or the amino acid were mixed so as to give percentages shown in Tables 2 and 3 below.

Thereafter, 1.5 mL of each reaction solution was taken in a micro-tube and was centrifuged at 5,200 G for five minutes using a centrifuge (Chibitan 2, manufactured by Merck Millipore Corporation). A supernatant liquid obtained after centrifugation was visually observed and the laking of the protein and the amino acid was evaluated on the basis of standards below.

Judgment Standards for Laking

A: A supernatant liquid is substantially colorless and transparent and substantially all of dye can be laked.

B: A supernatant liquid is colored and transparent and most of dye can be laked.

C: A supernatant liquid is strongly colored and has low transparency and a large amount of unlaked dye remains.

TABLE 2

|  | Protein ZFS SOYA | C.I. Acid Red 18 | Evaluation |
| --- | --- | --- | --- |
| Experiment 1 | 0 parts by mass | 100 parts by mass | C |
| Experiment 2 | 30 parts by mass | 70 parts by mass | C |
| Experiment 3 | 50 parts by mass | 50 parts by mass | C |
| Experiment 4 | 95 parts by mass | 5 parts by mass | A |

TABLE 3

|  | Protein L-Lysine | C.I. Acid Red 18 | Evaluation |
| --- | --- | --- | --- |
| Experiment 5 | 0 parts by mass | 100 parts by mass | C |
| Experiment 6 | 30 parts by mass | 70 parts by mass | B |
| Experiment 7 | 50 parts by mass | 50 parts by mass | A |
| Experiment 8 | 95 parts by mass | 5 parts by mass | A |

Production Method 3-1

Seven parts by mass of protein and 100 parts by mass of a 0.7 mass percent aqueous solution of a basic group-containing dye were added to a 50 mL eggplant flask, followed by dispersing at room temperature for 30 minutes using a magnetic stirrer. Subsequently, after solid-liquid separation was performed by suction filtration using filter paper (manufactured by Advantec Co., Ltd., Qualitative Filter Paper No. 1, 70 mm), filtered-out solid matter was washed with 6,667 parts by mass of distilled water six times. After the washed solid matter was transferred to a 50 mL eggplant flask and was vacuum-dried by heating at 50° C., obtained dry powder was passed through a sieve with 100 μm openings, whereby a pigment powder was obtained.

Production Method 3-2

Ten parts by mass of protein and 100 parts by mass of a one mass percent aqueous solution of a basic group-containing dye were added to a 100 mL beaker, followed by stirring at room temperature for 30 minutes using a magnetic stirrer. Subsequently, after solid-liquid separation was performed by suction filtration using filter paper (manufactured by Advantec Co., Ltd., Qualitative Filter Paper No. 1, 70 mm), filtered-out solid matter was washed with 3,000 parts by mass of distilled water. After the washed solid matter was transferred to a 100 mL beaker and was vacuum-dried by heating at 50° C., obtained dry powder was pulverized in a dry ball mill (manufactured by Fritsch Japan Co., Ltd., Pulverisette 6; zirconia balls with a diameter of 10 mm, a filling factor of 70%, 400 rpm for ten minutes twice). Subsequently, the pulverized powder was passed through a sieve with 100 μm openings, whereby a pigment powder was obtained.

Example 3-1

A red water-insoluble powder was obtained by a method described in Production Method 3-1 using defatted soy flour (produced by Nisshin Shokai Co., Ltd., ZFS SOYA) and C.I. Basic Red 9 (produced by Tokyo Chemical Industry Co., Ltd.) as protein and a basic group-containing dye, respectively. The recovery rate of powder before and after sieving was more than 99% on a mass basis.

Example 3-2

A red water-insoluble powder was obtained by a method described in Production Method 3-2 using defatted soy flour (produced by Nisshin Shokai Co., Ltd., ZFS SOYA) and C.I. Basic Red 9 (produced by Tokyo Chemical Industry Co., Ltd.) as protein and a basic group-containing dye, respectively. The recovery rate of powder before and after sieving was more than 99% on a mass basis.

Example 3-3

A red water-insoluble powder was obtained by a method described in Production Method 3-2 using defatted soy flour (produced by Nisshin Shokai Co., Ltd., ZFS SOYA) and C.I. Basic Red 2 (produced by Tokyo Chemical Industry Co., Ltd.) as protein and a basic group-containing dye, respectively. The recovery rate of powder before and after sieving was more than 99% on a mass basis.

Example 3-4

A red water-insoluble powder was obtained in substantially the same manner as that used in Example 3-3 except that a one mass percent solution of a basic group-containing dye using a sodium bicarbonate solution (a pH of 10) was used instead of an aqueous solution of a basic group-containing dye. The recovery rate of powder before and after sieving was more than 99% on a mass basis.

Example 3-5

A red water-insoluble powder was obtained in substantially the same manner as that used in Example 3-3 except that a one mass percent solution of a basic group-containing dye using a tetraborate decahydrate solution (a pH of 9) was used instead of an aqueous solution of a basic group-containing dye. The recovery rate of powder before and after sieving was more than 99% on a mass basis.

The powders obtained in Examples 1-1 to 1-33 were insoluble in water; hence, it was inferred that acidic group-containing dyes were all laked with protein.

The powders obtained in Examples 1-1 to 1-29 and 1-33 to 1-33 had the same type of color as that of dye, which was a raw material, and had excellent color developability. Furthermore, the powders that were obtained in Examples 1-30 to 1-32 in such a manner that color adjustment was performed by mixing dyes before laking and the obtained mixed dyes were laked in one operation had the same type of color tone as that of the mixed dyes, which were color-adjusted, and had excellent color developability.

From the evaluation results of Example 2-1 as shown in Tables 2 and 3, it could be confirmed that an amino acid could lake dye as compared to protein even if the percentage of the dye was large. It can be said that the amino acid exhibits higher laking efficiency as compared to the protein.

The powders obtained in Examples 3-1 to 3-5 were insoluble in water; hence, it was inferred that basic group-containing dyes were all laked with protein.

The powders obtained in Examples 3-1 to 3-5 had the same type of color as that of dye, which was a raw material, and had excellent color developability.

The invention claimed is:

1. A modified pigment obtained by laking a dye containing at least one of an acidic group and a basic group with at least one of an amino acid and protein.
2. The modified pigment according to claim 1, wherein the dye contains the acidic group and one or more acidic groups.
3. The modified pigment according to claim 1, wherein the acidic group or groups in the dye include a sulfo group, a carboxy group, or a salt thereof.
4. The modified pigment according to claim 1, wherein the dye contains the basic group and one or more basic groups.
5. The modified pigment according to claim 1, wherein the basic group or groups in the dye include an amino group or a salt thereof.
6. The modified pigment according to claim 1, wherein the average primary particle size is 1 nm to 100 μm.
7. A pigment composition containing the modified pigment according to claim 1 and resin.
8. A pigment composition containing the modified pigment according to claim 1 and a solvent.
9. A molded body made by molding the pigment composition according to claim 7.
10. An ink containing the pigment composition according to claim 7.
11. A print printed using the ink according to claim 10.
12. A method for producing a modified pigment, comprising allowing a dye containing at least one of an acidic group and a basic group to react with at least one of an amino acid and protein in the presence of a catalyst.

* * * * *